Oct. 23, 1928.

H. ARIENS

SOIL PULVERIZING MACHINE

Filed May 21, 1927

1,688,914

Inventor
Henry Ariens
By
Attorneys

Patented Oct. 23, 1928.

1,688,914

UNITED STATES PATENT OFFICE.

HENRY ARIENS, OF BRILLION, WISCONSIN, ASSIGNOR TO BRILLION IRON WORKS, OF BRILLION, WISCONSIN.

SOIL-PULVERIZING MACHINE.

Application filed May 21, 1927. Serial No. 193,196.

This invention relates to soil pulverizing machines, and is particularly directed to a rotary hoe or spading wheel for use with such machines.

This invention is an improvement over that disclosed in the copending application of Mark P. Ohlsen, Serial No. 183,697, filed April 14, 1927, for soil pulverizing machines, and has in general the same objects as those disclosed in such application.

Further objects of this invention are to provide a novel form of soil pulverizing machine in which a plurality of spading wheels are carried by a transverse shaft and are each provided with a plurality of projecting curved spading teeth adapted to enter the ground substantially vertically and to underhang the ground as they rise therefrom.

Further objects are to provide a novel form of pulverizing wheel in which the curved teeth, as described above, are arranged in staggered or offset relation so that successive teeth enter the ground at laterally spaced points, and to so construct the body of the wheel that it is fluted and relatively narrow adjacent the spading teeth to avoid a wide packing cylinder which would needlessly compact the ground as it was broken up.

Further objects are to provide a novel form of pulverizer in which two parallel shafts are provided, each equipped with sets of pulverizing wheels with one set of wheels constructed of curved and staggered teeth, and with the wheels of one set staggered with relation to the wheels of the next set, so that all portions of the ground over which the pulverizer passes, will be thoroughly broken up.

An embodiment of the invention is shown in the accompanying drawings in which.

Figure 1:
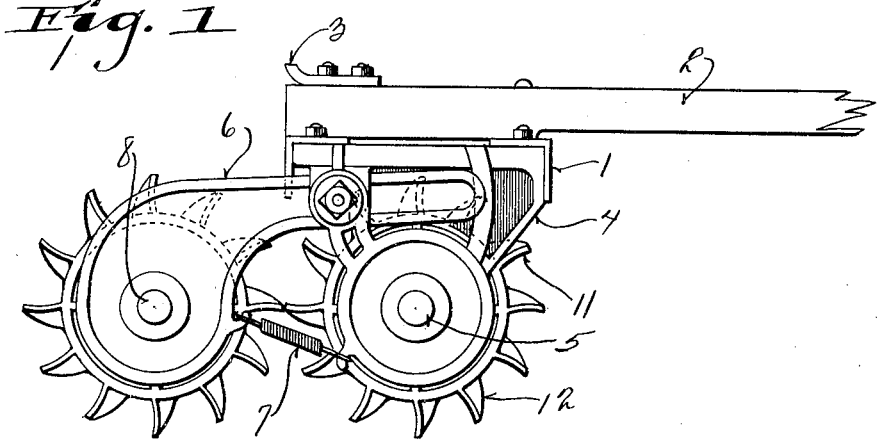
Figure 1 is a side view, partly broken away, of the machine.

Referring to the drawings, it will be seen that the pulverizer comprises a rectangular frame 1 provided with suitable draft means 2, such as a tongue, for instance, and with the usual seat, the support for the seat being indicated by the reference character 3. This frame is provided with a pair of downwardly projecting side members 4 which carry the forward transverse shaft 5. A pair of rearwardly and downwardly extending arms 6 are pivotally held to the brackets 4 and are urged downwardly and forwardly by means of the tension springs 7. These arms 6 carry a rear transverse shaft 8.

Figure 2:
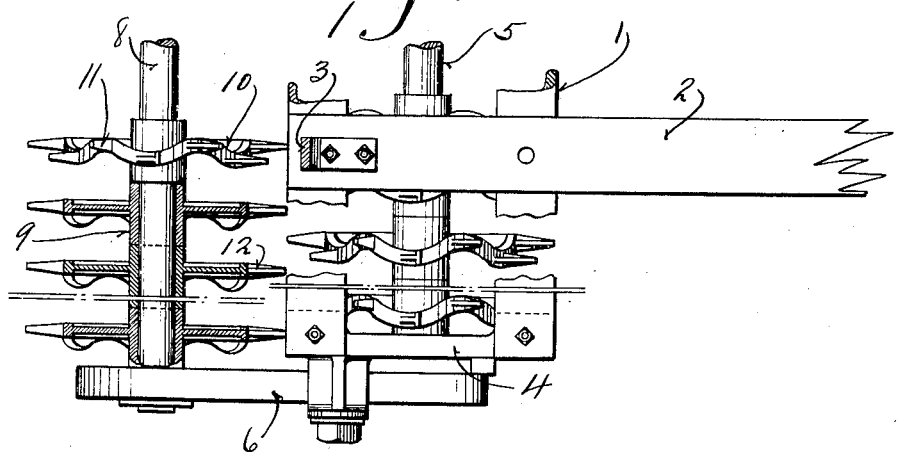
Figure 2 is a plan view, partly broken away, with the rear set of wheels partly in section, such section corresponding to a section on the line 2—2 of Figure 3.
Figure 3:
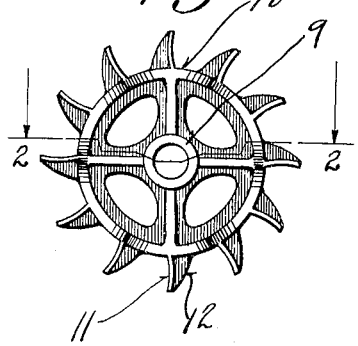
Figure 3 is a view of one of the pulverizing wheels removed from the machine.

One or both of the shafts are provided with pulverizing or spading wheels, as shown most clearly in Figures 2 and 3. These pulverizing or spading wheels are provided with hubs 9 loosely mounted upon the appropriate shaft and connected with a cylindrical drum or outer ring 10 by means of webs. The outer ring carries a plurality of forwardly and downwardly curved spading teeth 11 which are reenforced by webs 12, as shown most clearly in Figure 3. These spading teeth are curved downwardly and rearwardly, as stated, so that they will enter the ground substantially vertically and underhang the ground as they rise therefrom. This insures ease of entry into the ground and also secures a very effective spading action. In addition to these characteristics, it is to be noted from Figure 2, that the successive teeth 11 are staggered or offset laterally and also that the drum or ring 10 is similarly offset or fluted. This construction avoids a wide drum which would needlessly pack the soil and offset the desirable spading action of the teeth. Instead, however, the drum or fluted ring 10 scarcely packs the soil at all as it is very narrow.

It is to be noted from reference to Figure 2 that the wheels carried by the front shaft 5 are staggered in relation to the wheels carried by the rear shaft 8. It is to be noted also from Figure 2 that the center line of the wheels approximately touches the inner face of each of the successive teeth of such wheel.

It will be seen, therefore, that a novel form of pulverizer has been provided by this invention which is highly effective in operation, which will spade the ground in an efficient manner, and which insures the breaking up of all portions of the ground over which the pulverizer is drawn without the formation of definite channels in the ground.

It is to be noted also that these wheels may be employed with standard disc or other types of wheels as they are so made in length and size of hub and diameter that they cooperate with the standard type of wheels without requiring any change in construction of the machine. For example, the front row of wheels as carried by the shaft 5, may be standard wheels, if desired, although it is preferable to provide each set as shown in the drawing.

Although the invention has been described in considerable detail, such description is intended as illustrative rather than limiting as the invention may be variously embodied and as the scope of such invention is to be determined as claimed.

I claim:

1. The combination of a machine adapted to be drawn over the ground and provided with a pair of spaced and parallel shafts, a series of wheels carried by each shaft and adapted to dig into the ground with the wheels of one series staggered with reference to the wheels of the other series, one series consisting of wheels with their teeth staggered and curved and adapted to enter the ground substantially vertically and to underhang the ground as they rise therefrom.

2. A machine for pulverizing the ground comprising a body portion provided with a pair of spaced shafts, each of said shafts being provided with a series of spading wheels with the wheels on one shaft arranged in spaced relation to the wheels on the other shaft, each of said wheels being provided with staggered spading teeth, said teeth being rearwardly curved and adapted to enter the ground substantially vertically and to underhang the ground as they rise therefrom.

3. A speeding wheel for a soil pulverizer comprising a body portion provided with a hub and having a cylindrical flange, a plurality of teeth projecting outwardly from said flange, said teeth being rearwardly curved and staggered, whereby said teeth enter the ground substantially vertically and underhang the ground as they rise therefrom, said flange being relatively narrow and laterally fluted corresponding to the staggered arrangement of said teeth.

In testimony that I claim the foregoing I have hereunto set my hand at Brillion, in the county of Calumet and State of Wisconsin.

HENRY ARIENS.